(12) United States Patent  (10) Patent No.: US 7,790,999 B2
Olowinsky et al.  (45) Date of Patent: Sep. 7, 2010

(54) LASER BEAM WELDING METHOD

(75) Inventors: Alexander Olowinsky, Aachen (DE); Thorsten Kramer, Munich (DE); Arnold Gillner, Roetgen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1102 days.

(21) Appl. No.: 10/486,298

(22) PCT Filed: Aug. 7, 2002

(86) PCT No.: PCT/EP02/08848

§ 371 (c)(1), (2), (4) Date: Jun. 1, 2004

(87) PCT Pub. No.: WO03/013779

PCT Pub. Date: Feb. 20, 2003

(65) Prior Publication Data

US 2004/0232119 A1  Nov. 25, 2004

(30) Foreign Application Priority Data

Aug. 7, 2001  (DE) ................................. 101 38 651

(51) Int. Cl.
*B23K 26/20* (2006.01)
(52) U.S. Cl. ................................. 219/121.64
(58) Field of Classification Search ............... 219/121.6, 219/121.61, 121.63, 121.64, 121.83, 121.85
See application file for complete search history.

(56) References Cited

U.S. PATENT DOCUMENTS

| | | | | |
|---|---|---|---|---|
| 4,159,686 A | * | 7/1979 | Heim | 112/222 |
| 4,224,499 A | * | 9/1980 | Jones | 219/121.85 |
| 4,475,027 A | * | 10/1984 | Pressley | 219/121.6 |
| 4,541,151 A | * | 9/1985 | Herchenbach et al. | 24/265 WS |
| 4,574,176 A | * | 3/1986 | Sharp | 219/121.64 |
| 4,726,368 A | * | 2/1988 | Morris | 606/151 |
| 4,859,827 A | * | 8/1989 | Coyle et al. | 219/121.64 |

(Continued)

FOREIGN PATENT DOCUMENTS

DE  38 20 848  4/1989

(Continued)

OTHER PUBLICATIONS

U.S. Appl. No. 60/231,587, filed Nov. 1985, Japan.

(Continued)

*Primary Examiner*—Samuel M Heinrich
(74) *Attorney, Agent, or Firm*—Greenblum & Bernstein, P.L.C.

(57) ABSTRACT

A method of producing a welding seam with a single laser pulse, the laser pulse and the work piece being moved relative to each other at a high velocity. This results in the length of the welding seam formed being primarily the product of pulse duration of the laser pulse and the relative velocity of work piece and laser pulse. The invention also relates to a method in which the work piece moved at high velocity relative to the laser beam is subjected along the welding seam to be formed to repeated applications of a single laser pulse. In that case the length of the welding seam is defined principally of the product of pulse duration of the laser pulse and the relative velocity of the work piece and laser pulse divided by the number of applications.

15 Claims, 7 Drawing Sheets

U.S. PATENT DOCUMENTS

| | | | |
|---|---|---|---|
| 5,013,275 A | 5/1991 | Kautz | 445/30 |
| 5,041,714 A * | 8/1991 | Funk | 219/121.62 |
| 5,138,130 A * | 8/1992 | Islam et al. | 219/121.6 |
| 5,221,515 A * | 6/1993 | Thiebaut et al. | 376/261 |
| 5,227,588 A * | 7/1993 | Schreiber et al. | 174/262 |
| 5,451,742 A * | 9/1995 | Nishio et al. | 219/121.64 |
| 5,500,503 A * | 3/1996 | Pernicka et al. | 219/121.64 |
| 5,595,670 A | 1/1997 | Mombo-Caristan | 219/121.64 |
| 5,844,198 A * | 12/1998 | Jones et al. | 219/121.64 |
| 5,925,268 A * | 7/1999 | Britnell | 219/121.63 |
| 6,295,714 B1 * | 10/2001 | Roychowdhury et al. | 29/516 |
| 6,300,591 B1 * | 10/2001 | Fuerschbach et al. | 219/121.64 |
| 6,371,383 B1 * | 4/2002 | Bulgatz | 239/1 |
| 6,387,829 B1 * | 5/2002 | Usenko et al. | 438/120 |
| 6,449,297 B1 * | 9/2002 | Takase | 372/38.04 |
| 6,500,393 B2 * | 12/2002 | Nakamori et al. | 422/180 |
| 2002/0195432 A1 * | 12/2002 | Sekiguchi | 219/121.64 |

FOREIGN PATENT DOCUMENTS

| | | |
|---|---|---|
| DE | 198 16 051 | 10/1999 |
| EP | 000207549 A1 * | 1/1987 |
| EP | 0440002 | 8/1991 |
| EP | 0923424 | 2/1998 |
| EP | 1201610 | 5/2002 |
| FR | 2779244 | 12/1999 |
| GB | 2253282 | 9/1992 |
| JP | 411170075 A * | 6/1999 |

OTHER PUBLICATIONS

U.S. Appl. No. 11/192,567, filed Jul. 1999, Japan.
U.S. Appl. No. 11/267,869, filed Oct. 1999, Japan.
U.S. Appl. No. 60/313,682, filed Dec. 1988, Japan.

* cited by examiner

LASER BEAM WELDING METHOD

BACKGROUND OF THE INVENTION

1. Field of the Invention

The invention relates to a method of welding of work pieces by pulsed laser radiation, in particular of components of precision and micro system technology, in accordance with the preamble of claim 1. The joining of components in the field of horology and, in this context, the welding of clock or watch components such as pinions, crowns and axles of mechanical clocks or watches is a preferred field of application.

A further field of application is the electric industry, for instance in the area of sensors equipped with diaphragms for measuring gas pressures or temperatures. Such sensors require especially thin diaphragms reliably welded to the remaining components.

Furthermore, the invention may be applied in the area of automotive industry, for instance for joining rotationally symmetric components of a diameter less than 5 mm, for instance components of fuel feed devices for combustion engines or for connecting hubs to shafts. Plug connections may be produced as well by the welding method in accordance with the invention, particularly such plugs which have hitherto typically been soldered with a lead-containing solder. Plugs of copper and brass may be produced particularly well. In addition, the invention is particularly well suited for welding foil capacitors in view of the fact that low energy application is required for the protection of the dielectric disposed between the foils which has not heretofore been achievable by conventional resistance gap welding.

The method according to the invention is furthermore suitable for welding together components of different materials such as, in particular, for welding together steel and brass.

2. The Prior Art.

In the field of macro technology, laser beam welding is generally known, and this contexts it constitutes a major field of application of lasers. Thus, DE 3,820,848 A1 discloses a welding method with pulsed laser radiation the intensity of which is controlled for forming at the connection site a laser-induced plasma as a function of one or more connection site parameters.

Furthermore, EP 0,440,002 B1 describes a device for spot welding by which body components of an automotive vehicle are welded by means of a multiple-joint robot arm. In this arrangement, the parts to be welded move by the welding robot arm at low velocity and are welded thereby be a plurality of spot welds.

EP, 0923,424 B1 teaches the use of a movably mounted beam deflection unit with a stationary laser welding head, which by a plurality of spot welds yields a corresponding number of line welds which are spatially separated from each other.

Aside from the selection of pulsed laser radiation for the welding of macro components as in the previously mentioned publications, welding by continuous laser radiation is also known. In general, this results in a more uniform application of energy into the components to be welded and, therefore, to lower distortion. A further advantage resides in the reduced soiling of the components. by liquified or vaporized material.

Furthermore, it is generally known that processing and fabrication methods in the field of macro technology cannot usually be transferred to the field of micro systems technology. Based upon the specific conditions of the micro systems technology, new or specially adapted processes are often required. Because of their small dimensions, components of mechanical watches are typically joined by adhesive or press joining methods, for instance.

The adhesive method requires pre and post processing steps, however, and the components have to b cleaned in a time-consuming manner. Moreover, a further processing steps is necessary, i.e. the application of the adhesive. These requirements significantly prolong the fabrication process. In addition, in respect of the intended adhesive connect ion, the time between application of the adhesive and connection of the parts is critical.

In the case of pressed connections, narrow mechanical tolerances must be maintained which limit the application of press joining technology. The press joining technology requires the application of mechanical force. However, this force subjects the components to deformations and distortions. Thus, it is often difficult to adhere to the required low tolerances.

OBJECTS OF THE INVENTION

It is an object of the invention to provide an alternative connection process which results in particularly low distortions of the connected components.

BRIEF SUMMARY OF THE INVENTION

In the accomplishment of these and other objects, the invention provides for a method of laser beam welding with the laser beam and work piece being moved relative to each other at a predetermined velocity to provide a welding seam by a single laser pulse of predetermined duration, the length of the welding seam being primarily defined by the product of the velocity and the duration of the pulse.

Other objects will in part be obvious and will in part appear hereinafter.

The invention led to the realization that the technical problem mentioned above can be solved by a welding method by which the welding seam is formed by a single laser pulse having a pulse duration $T_H$, and in which the length l of the welding seam, relative to the direction of welding movement, is primarily determined by the product of the feed velocity v and pulse duration $T_H$.

The invention is based upon the realization that at a relative velocity between the laser beam and the work piece the resultant welding spot on the work piece is longer than it would be without the relative movement.

Without such high relative velocity between the work piece and the laser beam, the length l of the welding seam, relative to the direction of forward movement of the weld, such as, for instance, the forward movement of the laser beam, is typically larger by a factor of 1.5 to 2 than the extent of the width $b_o$ of the welding seam relative to the direction. By way of approximation, it can be said that for the case of low relative velocity the two values are equal, i.e. $l \approx b_o$.

Moreover, where the relative velocity between work piece and laser beam is zero, using a rotationally symmetric beam, the length of the welding seam l equals the width of the welding seam $b_o$, i.e. $l = b_o$ if $v = 0$. Since in most cases operations are carried out with rotationally symmetric beams, in the context of the present invention and in the absence of relative velocity between work piece and laser beam, the parameter welding seam width $b_o$ in general also defines the length of the welding seam in the forward welding direction, regardless of the laser beam being actually rotationally symmetric. Of course, the method in accordance with the invention may be practiced regardless of the shape of the laser beam.

In conventional spot welding and in connection with work pieces of steel, given a beam diameter of the laser radiation on the work piece relative to, or measured with respect of the laser beam advance movement, of 200 µm, the length of the welding seam in this direction also measures about 200 µm. Hence, for a desired welding seam length in the millimeter or centimeter range, a sequence of overlapping welding spots is required.

Where the relative velocity v between work piece and laser beam is greater than zero, the beam diameter on the work piece is extended by the distance v×t, t being the time during which the work piece is subjected to radiation. Where one laser pulse is applied, the time t equals the pulse duration $T_H$. Thus, the entire length of the welding seam is $l=b_o+v \times T_H$.

Placing a single welding spot by the conventional spot welding method, the length l of the welding seam of this single welding spot is dominated by the diameter of the beam or, in other words, the term $v \times T_H$ is small relative to the width of the welding seam $b_o$ dominated by the diameter of the welding seam. The opposite is true in the method in accordance with the invention, where at welding seam length l the term $v \times T_H$ dominates or where the length of the welding seam l is primarily determined by the advance of the beam diameter on the work piece.

The result is that in the advance direction of the laser beam the welding seam being formed is longer than it would be in the absence of a corresponding large relative velocity. Preferably, the product of advance velocity v and pulse duration $T_H$ is greater than the extent of the width $b_o$ of the welding seam on the work piece relative to the direction of welding advance, by a factor of at least $n_s=3$, and, more particularly, by factor $\eta_s=10$. Obviously, $\eta_s$ is the quotient from the product of the advance velocity and the pulse length divided by the width $b_o$ of the welding seam, i.e. $\eta_s=(v*T_H)/b_o$.

The relative velocity v between laser beam and work piece to be selected in the an actual application is thus determined by the quotient of the desired length l of the welding seam and the pulse duration $T_H$. Therefore, at a desired welding seam length l of 1 mm and at a pulse duration of 20 ms the relative velocity to be selected would be 3 m/min.

In the case of multiple application of the welding seam, the required relative velocity must be multiplied by the number of applications.

The relative velocity between laser beam and work piece may be selected to be as high as 50 m/min. This ensures particularly long welding seams in view of the fact that the length of the welding seam obtained is the result of the product of relative velocity v and pulse duration $T_H$. Where, for instance, the pulse duration $T_H=20$ ms, the width of the welding seam $b_o=0.4$ mm and the relative velocity v=50 m/min, it is possible, with the method according to the invention, to attain a welding seam length l=17.1 mm with a single laser pulse. Furthermore, as a result of the high relative velocity the energy of the pulse may be applied over a particularly long distance and therefore at a particularly low distance energy yielding components of even lesser distortion. Such high relative velocity results in a factor of $\eta_s>40$. It was thus possible to achieve satisfactory results in welding copper and brass.

If a relative velocity in excess of 50 m/min is selected the occurrence of such physical effects as humping may be expected. Therefore, depending upon the given material, the maximum possible velocity in connection with the method in accordance with the invention should be limited to 50 to 60 m/min. Where these effects are less pronounced, higher relative velocities may be selected.

The application of continuous wave radiation or pulsed laser radiation as a sequence of pulses are avoided by the welding method in accordance with the invention. As a consequence, the total energy applied to a component is particularly low resulting in a correspondingly low distortion of the component. Relative to conventional pulsed laser radiation of macro components, the application of energy is lower by a factor of about 10.

A further advantage of the welding method in accordance with the invention is that when welding alloys, the welding seam is less subject to fissures and displays fewer pores. It is assumed that the improved quality of the welding seem is the result of the fact that in the method in accordance with the invention the material is melted only once, whereas in spot welding with overlapping welding spots the material is melted repeatedly. However, during multiple melting more time is available to the material during which its alloy components can separate or during which one or more of the components of the alloy may vaporize. In the single melting of the method in accordance with the invention, the operation is too quick to result in the formation of a significant separation.

Moreover, the process provides for particularly clean welding, i.e. no contaminations occur as a result of particles from the welding area. A problem of such contaminations occurs, for instance, when welding work pieces of brass, i.e. an alloy CuZn37. The melting point of this alloy is 920° C., and the vaporizing temperature of zinc is about 908° C. The application of high energy in conventional pulsed welding methods results in zinc vaporizing from the alloy. When welding with the method in accordance with the invention, experiments displayed no zinc evaporation, and the welded work pieces of this alloy remain clean. Probably, as set forth in the preceding paragraph, the reason for this resides in the single melting allowing no substantial proportion of the zinc to separate and to be present in elementary state.

It has generally been found that the method in accordance with the invention is particularly advantageous in connection with metallic materials. The reason for this resides in the generally high heat conductivity of metallic materials. The high heat conductivity requires operating at high power levels so that as high a proportion as possible of the energy applied serves to create a locally limited melt bath without being distributed in the entire work piece. In addition, the absorption of copper, for instance, of the applied radiation is very low. For that reason, some of the metallic materials, for instance brass and copper, can be treated with continuous wave lasers on a limited scale only, for the power generated by the latter is in general significantly lower than the power of the pulses of pulsed lasers.

Since the medium output power of pulsed laser radiation is low, the laser radiation, compared to a CW laser of the same power, is of a higher radiation quality, and it is possible, therefore, to focus to a smaller diameter at the same operating distance. In this manner it is possible to form welding seams of a width <100 µm, which are barely discernible to the naked eye. This is important for connections in products, such as watches and clocks, which require a high degree of visual appeal, or where a flawless appearance is important to induce a customer to purchase a product.

Compared to conventional press-joining, glueing and crimping methods, laser welding methods offer the further advantage of a particularly short processing time, in view of the fact that such process steps as cleaning of the components after joining can be avoided. This makes the processing of the components more cost efficient. Moreover, compared to known laser welding methods, practicing the method in accordance with the invention results in a processing time lower by a factor of 10. Furthermore, the known laser welding methods inject so much energy into the components leading to heating smaller components such that they would be unacceptably distorted. Not until the method of the present invention has it been possible to weld of small components with a laser at advantages over known joining techniques.

The laser pulse may be provided by a conventional pulsed laser of a low median laser power sufficient for the method in accordance with the invention. Compared to continuous wave laser beam sources, the advantage of the pulsed laser beam source is that its investment and maintenance costs as well as corresponding costs for the required cooling aggregates are especially low because of its low average output power. Alternatively, a lamp-pumped of diode-pumped CW-laser may be chosen provided laser pulses can be set at a pulse duration <100 ms.

Processing with particularly low distortions of components may be achieved by selecting the relative velocity between work piece and laser radiation sufficiently high so that for producing a single welding seam the components are sequentially subjected several times to a single laser pulse along the welding seam to be formed. In this manner, the entire energy is substantially simultaneously injected into the entire welding seam to be formed. The resultant practically simultaneous heating of the components along the welding seam leads to a lower distortion than does the chronologically sequential heating of the components along the welding seam. In this alternative embodiment of the invention the length of the welding seam is primarily determined by the product of the advancement velocity v and the length $T_H$ of the pulse divided by the number of applications.

This alternative embodiment of the invention is especially useful in connection with small rotationally symmetric components which may be rotated at high speeds. Moreover, in rotationally symmetric components the almost simultaneous heating results in a particular reduction of distortions.

In a further embodiment of the invention the power of the laser pulse may be altered over time. Such a chronological change in the output power of the pulse or chronological change of the pulse formation makes it possible to take into consideration the change in optical properties of the material as may occur during processing. Thus, in laser welding the degree of coupling is strongly dependant upon the absorption of the material. Also, the oxidation of the surface and the roughness of the surface affect the welding operation. The absorption is also subject to the temperature of the material and in general increases with rising temperatures. Changing conditions along the length of the welding seam may thus be compensated by changes in the formation of the pulse. The penetration depth of the weld and the width of the seam as well as the quality of the surface of the welding seam may also be influenced by the pulse formation.

For further improving the quality of the welding seam, a detector may detect characteristic radiation from the welding site, such as reflected radiation or heat radiation, and the power of the laser may be adjusted in accordance with the signals received by the detector during processing. Since the signals received by the detector are primarily dependent upon temperature, the laser power may be adjusted as a function of with temperature. As referred to in the preceding paragraph, this adjustment of the laser power results in an optimized energy injection into the work piece and accordingly to an improved result of the weld.

It is, of course, possible to provide several welding seams, such as a "basting seam", in one component by the welding method in accordance with the invention.

The relative velocity between the laser beam and the components to be welded may take place either by moving the processing optics, by moving the components, or by moving both the processing optics and the components. The choice is dependent upon the geometry of the components and the required joints. The set relative velocity depends upon the type of movement, such as linear or rotational, as is limited by such physical effects as humping.

A further improvement of the welding seams may be obtained by relative movement between work piece and laser beam such that the laser beam is aimed as precisely as possible at the desired welding seam, i.e. the seam is being traced. This may be accomplished by an evaluation unit, e.g. a camera or a light section device which evaluates the site at which the laser beam is to impinge upon the work piece. The relative movement between work piece and laser beam may be controlled as a function of this evaluation. It is of particular advantage during the welding operation to detect the position on the work impinged by the laser beam. By comparing the actual impinged position against the desired position impinged by the laser beam, the relative movement between work piece and laser beam may be appropriately adjusted so that the laser beam impinges as precisely as possible on the work piece along the desired welding seam. In this manner, positioning errors of the components to be welded may be adjusted and higher tolerances in positioning the components to be welded may be accepted. Without the mentioned measures the permissible tolerances are less than 10% of the width $b_o$ of the welding seam.

With stationary components, the laser beam may be moved. This is often advantageous in view of the fact that the laser beam may usually be moved with greater precision than the components. Moreover, movement of the components may result in an undesirable shifting of the components to be welded relative to each other.

DETAILED DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS

Figure 1A:
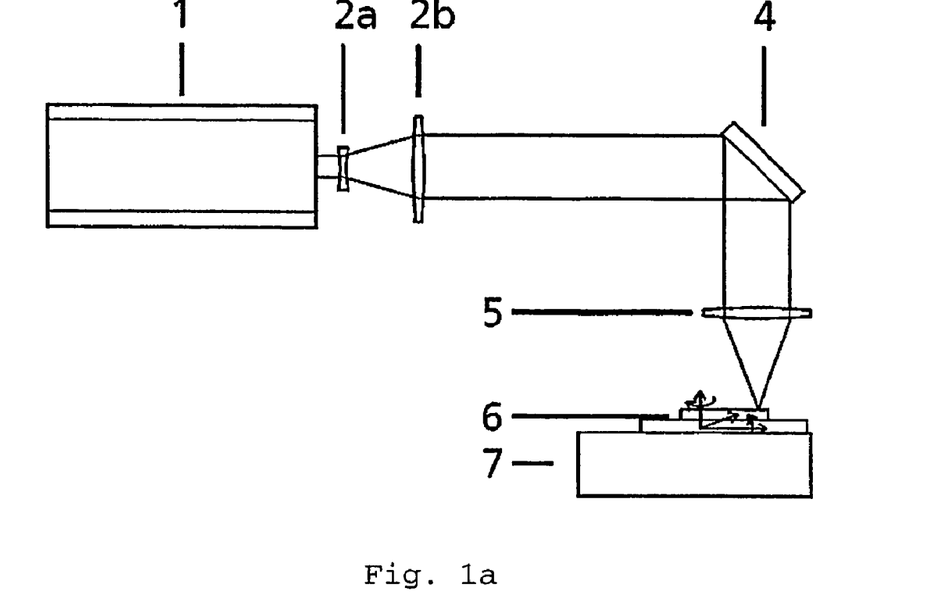
FIG. 1a schematically depicts a first embodiment of an apparatus having a three-dimensionally movable work support surface for practicing the invention.

In accordance with FIG. 1a, processing of the components may take place by directing the beam of a laser 1 against the component 6 by way of a beam spreader 2a and 2b, a deflector 4 and the processing optics 5. The component 6 is positioned on a moveable positioning system 7. The positioning system may be a rotational plate or a linearly moveable table. Combinations of rotational plate and linearly moveable table may be provided as well. Accordingly, linear movements, rotary movements as well as combinations of rotational and linear movements may be achieved. By these movements it is possible to provide linear welding seams, rotationally symmetric welding seams and welding seams of any desired shape.

Figure 1B:
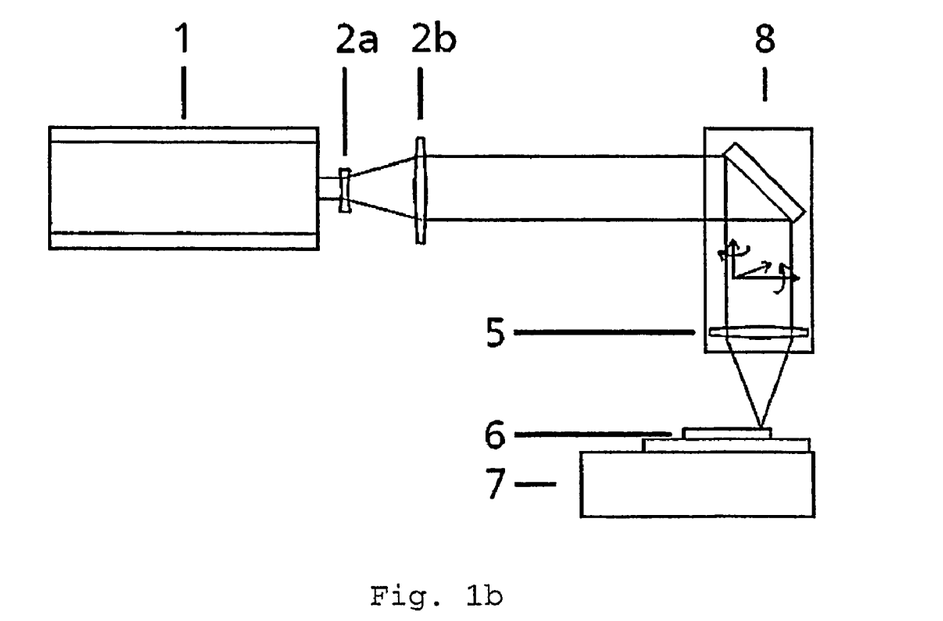
FIG. 1b schematically depicts a second embodiment of an apparatus having a three-dimensionally movable laser welding head.

Another possibility of providing relative movement between a work piece and a laser beam is to move the laser beam. For this purpose, special optics such as a scanner 8 may be used as shown in FIG. 1b.

Figure 1C:
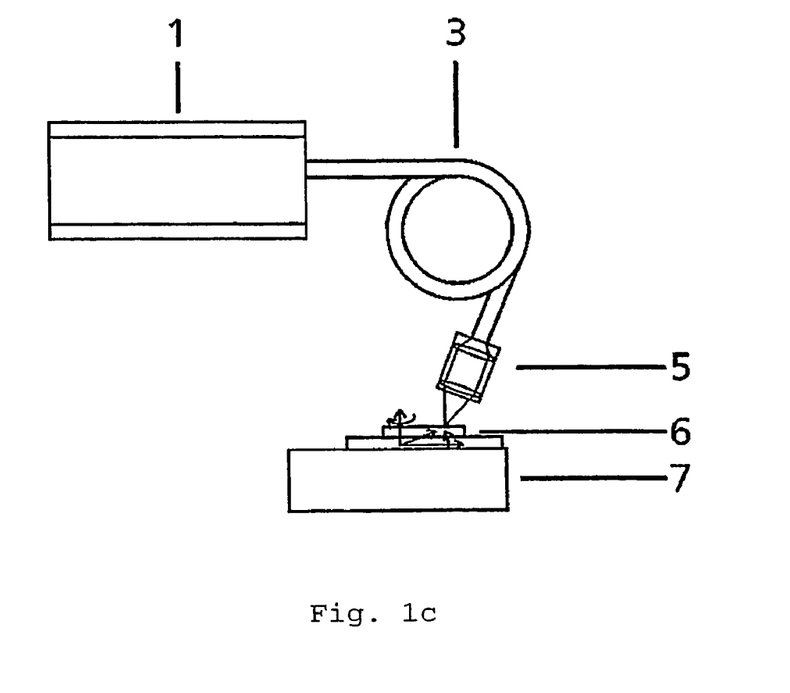
FIG. 1c schematically depicts a third embodiment of an apparatus having a fiber-optics suspended laser welding head.

Instead of the rigid beam guidance of FIG. 1a, a flexible light guide 3 as shown in FIG. 1c, may be used. From it, the light enters the processing optics 5 whence it is directed against the component 6 positioned on a motion imparting system 7.

Figure 2A:
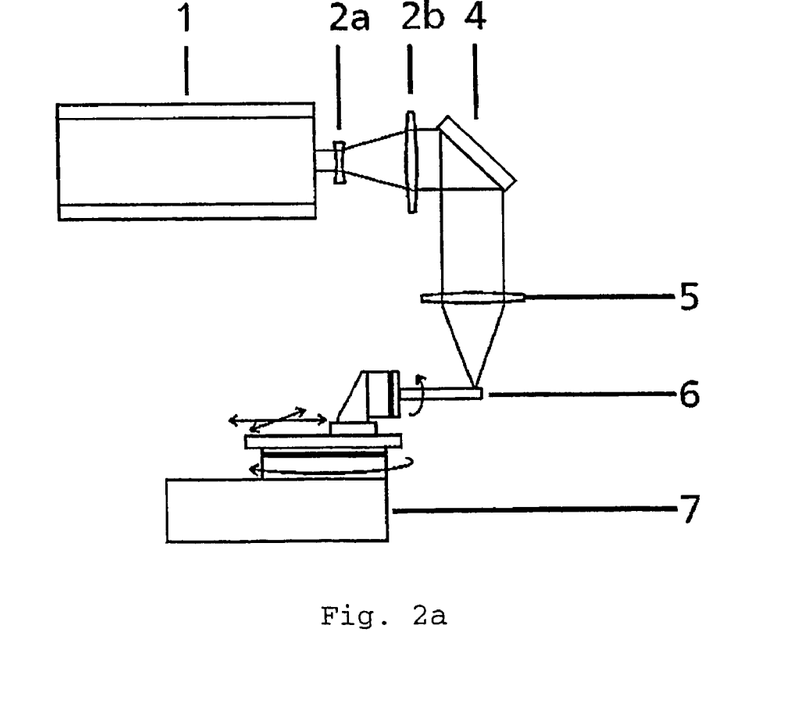
FIG. 2a schematically depicts a fourth embodiment of an apparatus similar to that of FIG. 1a but provided with a work support structure movable about four axes.

A further possibility is to direct the laser pulse to the component 6 supported by a system 7 moveable about four axes as shown in FIG. 2a. In this case, the component 6 may be rotated about an axis position vertically positioned in the plane of the drawing as well as about an axis positioned horizontally in the plane of the drawing, as indicated in FIG. 2a by bent arrows. In addition, the component may be moved in a plane positioned vertically of the plane of the drawing as indicated in FIG. 2a by intersecting arrows.

Figure 2B:
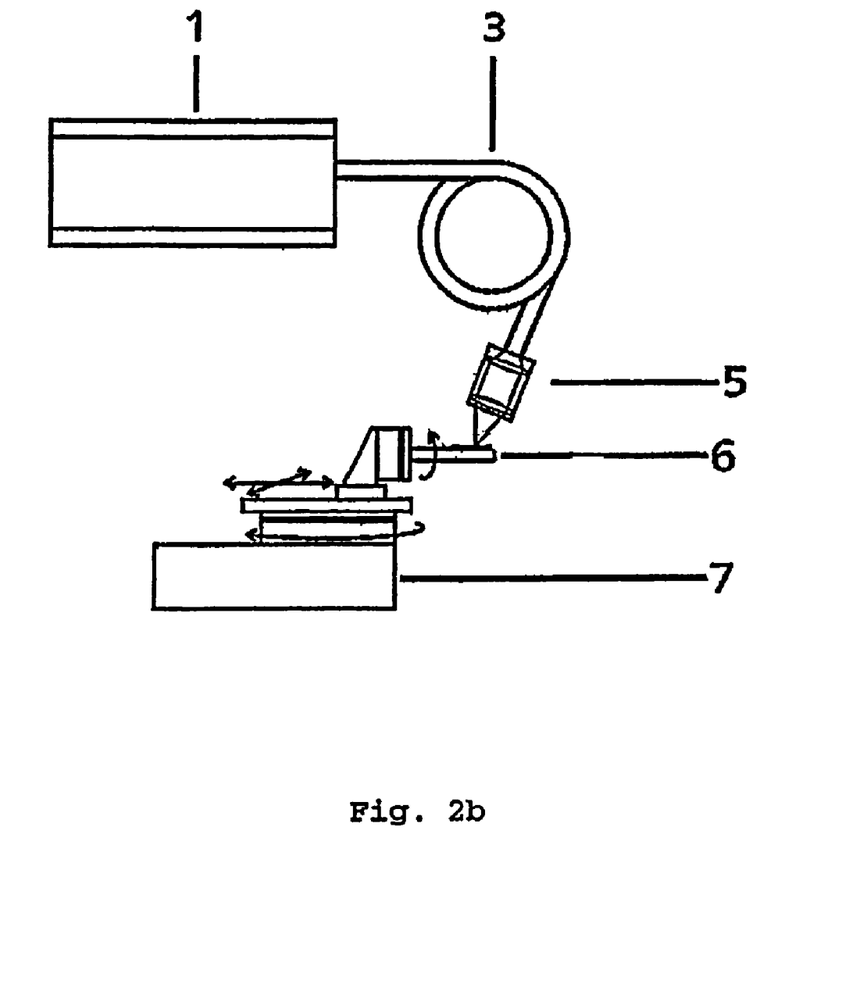
FIG. 2b schematically depicts a fifth embodiment of an apparatus provided with a fiber-optics suspended welding head and a work support structure movable about four axes.

FIG. 2b depicts the possibility of directing laser light through a flexible light guide 3 to the processing optics 5 and thence to the component 6 moved by a four-axes positioning system 7. The choice of a four-axes positioning system makes it possible by a single laser pulse to form rotationally symmetric welding seams.

Figure 3A:
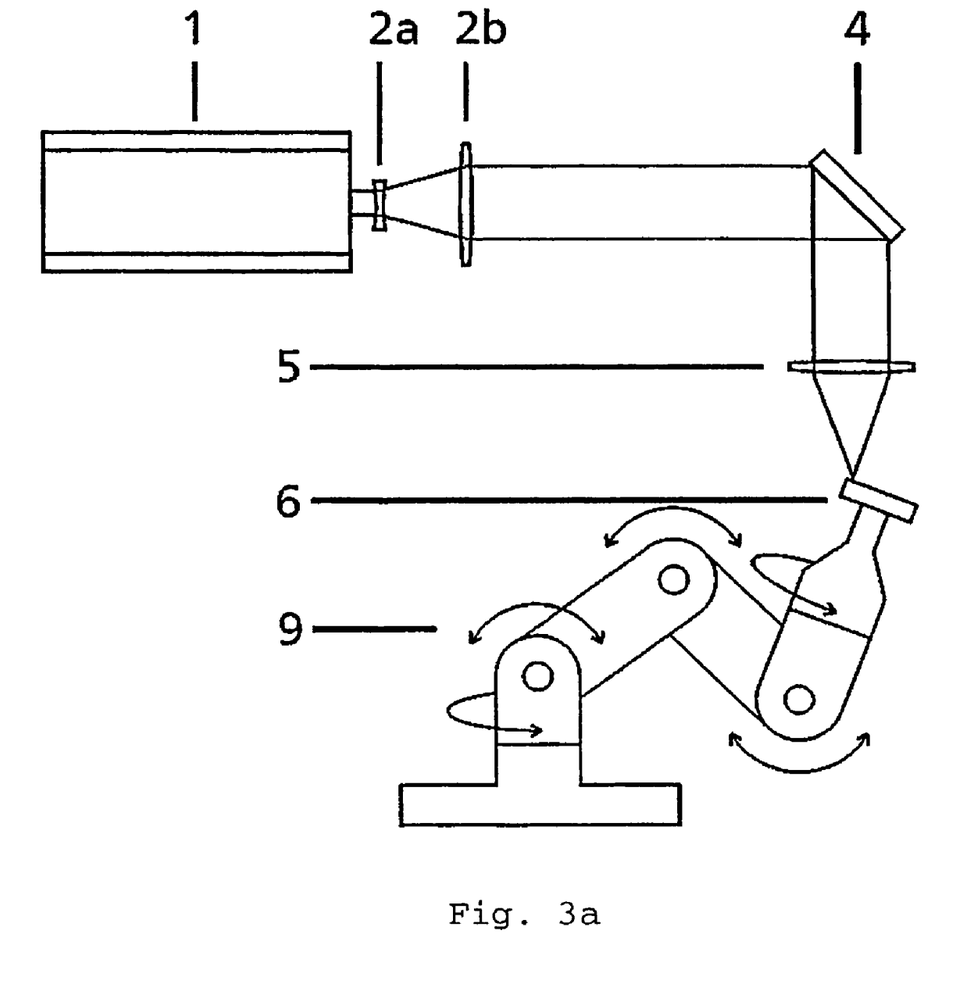
FIG. 3a schematically depicts a sixth embodiment of an apparatus for practicing the invention provided with a robot as a work support structure.

With light guidance identical to that of FIG. 1a, FIG. 3a depicts the possibility of directing the laser light to a component 6 moved by a robot 9.

Figure 3B:
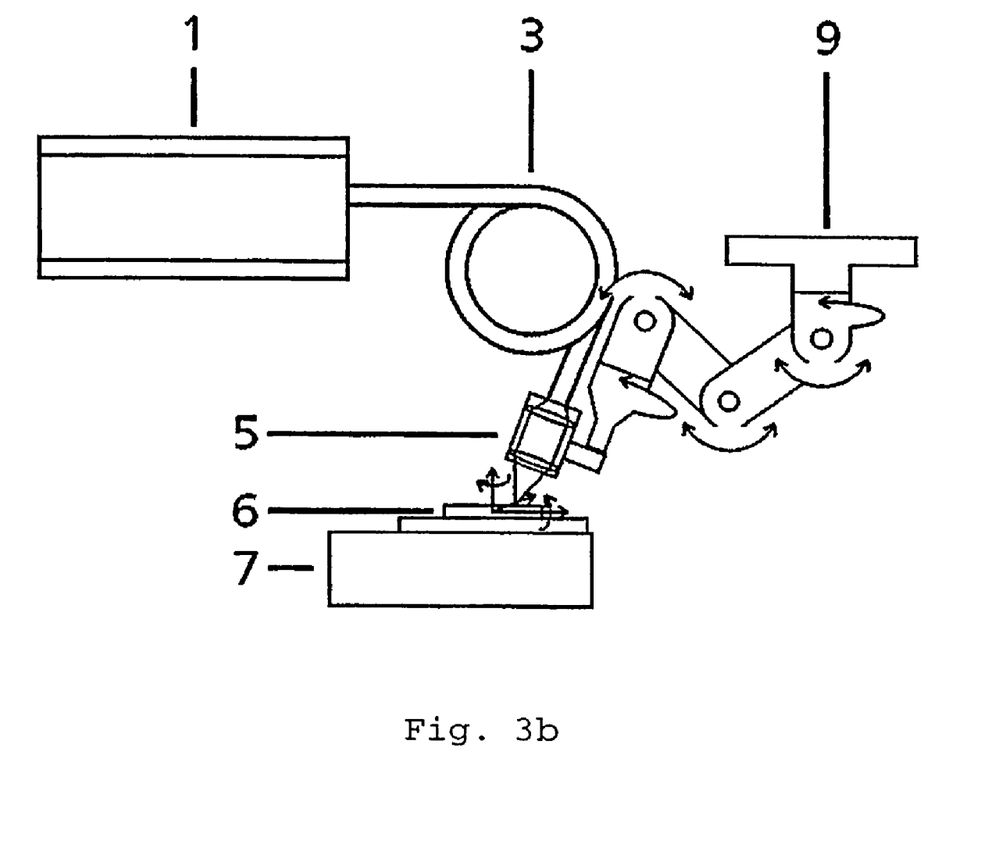
FIG. 3b schematically depicts a seventh embodiment of an apparatus provided with a robot-controlled fiber-optics welding head and a work support structure movable about four axes.

FIG. 3b depicts a variant of an industrial robot 9 which moves a light guide 3 for directing the laser light to predetermined locations of the component 6 which are appropriately positioned by the movement system 7.

DETAILED DESCRIPTION OF THE PREFERRED EMBODIMENT

The invention will hereafter be described in greater detail with reference to embodiments.

Figure 4:
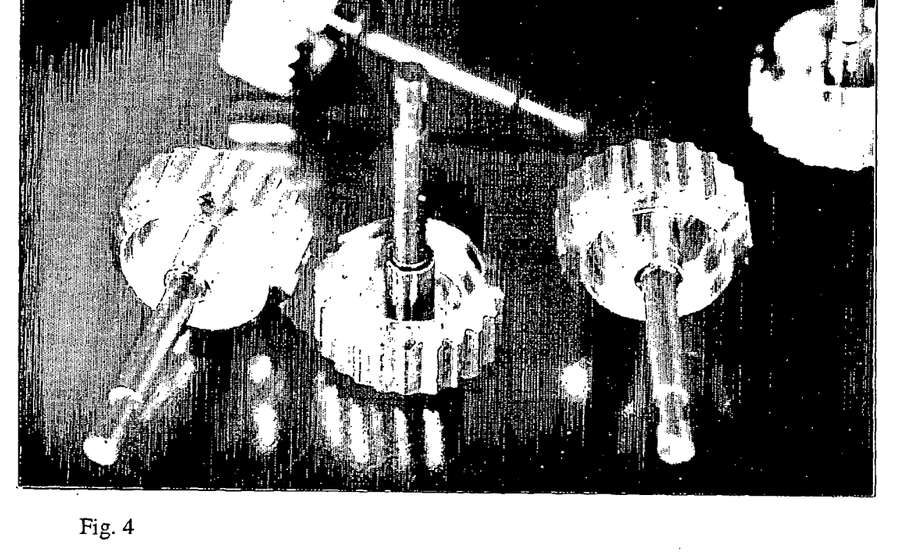
FIG. 4 depicts watch components welded together by the method of the instant invention.

In accordance with a first embodiment according to FIG. 4, watch components are being welded. The shafts and crowns of mechanical watches are shown in FIG. 4 and both of them consist of stainless steel. The diameter of the shaft measures 0.9 mm, and the crown has a diameter of 5 mm. During production, shaft and crown are made separately, and the shaft is then inserted into the cylindrical recess in the center of the crown. In this instance, welding serves to provide a secure connection between the shaft and the crown. Welding was carried out by a single laser pulse of 20 ms duration, a pulse power of 125 W at a pulse energy of 2.5 J. At a welding velocity of 8.5 m/min the energy of the distance was 0.88 J/mm with the length of the welding seam being $\pi \times 0.9$ mm=2.8 mm. The structure of the watch components welded by the method in accordance with the invention was of significantly higher precision and stability by comparison with adhesively produced watch components. Pre-treatments are no longer necessary, and usually the watch components may be used without cleaning, particularly if welding takes place with a protective gas for preventing soiling and oxidation. Furthermore, the force required for pulling the components apart was increased by a factor of 10 relative to adhesively connected components.

Figure 5:
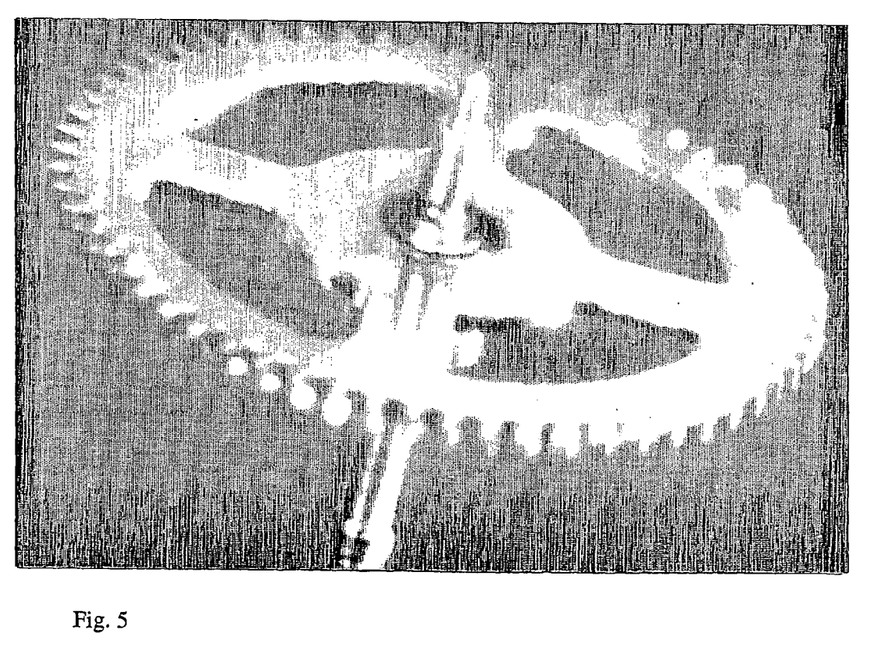
FIG. 5 depicts a pinion of a watch welded to a shaft by the method in accordance with the invention.

In a second embodiment, as shown in FIG. 5 a shaft of 0.3 mm diameter was welded to a pinion of a mechanical watch. The shaft consists of stainless steel, and the pinion consist of brass, e.i. a CuZn37 alloy. At a relative velocity of 2.83 m/min, welding was carried out with a pulse energy of 1.3 J for the entire welding seam and a pulse duration of 20 ms. The distance energy was 1.38 J/mm.

In a third embodiment the welding of the second embodiment was carried out at a relative velocity of 15 m/min. The length l of the welding seam in this instance was equal to the circumference $\pi \times 0.3$ mm=0.95 mm. Welding was performed with a single pulse of 4 ms duration at a pulse energy of 150 W$\times$4 ms=0.6 J and a distance energy of 0.63 J/mm.

Figure 6:
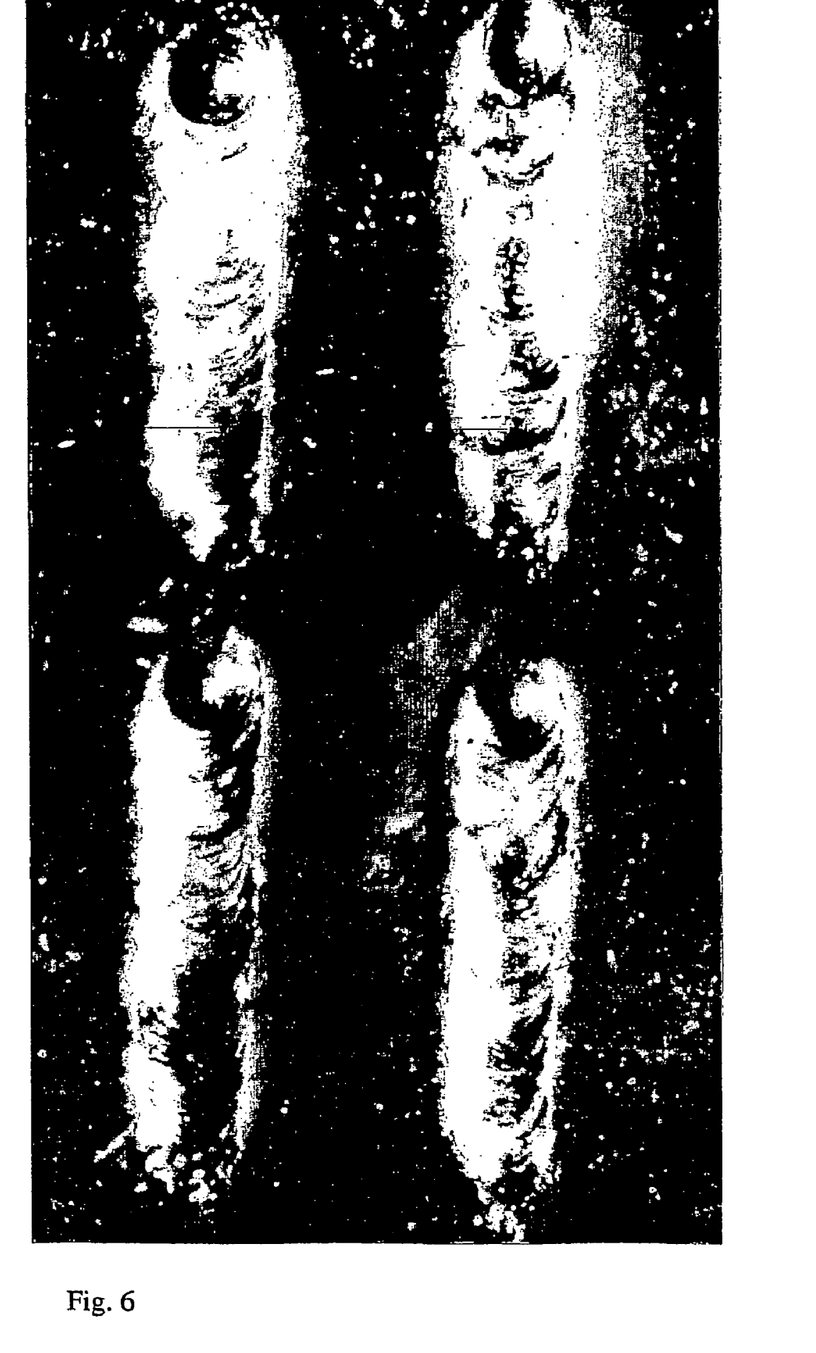
FIG. 6 depicts a welding seam formed on a sheet of copper by the welding method in accordance with the invention.

In a fourth embodiment according to FIG. 6 a copper sheet of 0.2 mm thickness was welded. A single welding seam has a seam width of $b_o$=0.7 mm and a seam length l of 3.55 mm. It was formed by a single pulse of a focal point diameter of 0.25 mm and a pulse duration of 20 ms. The pulse energy was 25.8 J at a distance energy of 7.4 J/mm.

By subjecting the copper sheet to the same radiation source but conventional processing with 11 individual pulses of a pulse energy of 21.6 J each, it was possible to obtain the same welding result as regards stability at the same welding seam length. The energy applied to the work piece thus amounted to 237.6 J at a distance energy of 67.9 J/mm. The pulse power of the used rectangular pulses was $P_H$=2,700 W, the pulse duration $T_H$=8 ms and the pulse repetition frequency $f_p$=2.5 Hz. The feed velocity was 1.5 mm/sec; the required processing time was 4.4 s. With the method in accordance with the invention the processing time is equal to the required pulse duration $T_H$=20 ms. Hence, the processing time of conventional welding is greater by a factor of 220. Furthermore, with conventional welding 9.2 times the amount of energy had to be applied to the work piece in order to yield the same stability at a welding seam of the same length. In addition, the seam requires a width of 0.75 mm. One reason for the slightly greater seam width at the conventionally pulsed welding technique is the application of more energy and the resultant higher heating of the work piece. This leads to a slightly larger area of the work piece being melted and to a larger welding seam.

What is claimed is:

1. A method of laser beam welding of a work piece, comprising:

moving a laser beam and a work piece relative to each other at a velocity v, producing a welding seam by a single laser pulse of pulse duration $T_H$ having a length l primarily defined determined by a product of the velocity v and the pulse duration $T_H$, wherein the product of velocity v and pulse duration $T_H$ is greater than a width of the welding seam $b_o$ on the work piece by at least a factor of 10.

2. The method of claim 1, wherein the welded workpiece comprises components of precision and micro system technology.

3. A method of laser welding of a work piece, comprising:
moving a laser beam and a work piece relative to each other by velocity v, forming a welding seam by repeating a number of applications of a single laser pulse of pulse duration $T_H$ over a weld seam area, the welding seam having a length l relative to a welding feed direction that is primarily determined by a product of velocity v and pulse duration $T_H$ divided by the number of applications, wherein the product of velocity v and pulse duration $T_H$ is greater than a width $b_o$ of the welding seam on the work piece relative to the welding feed direction by at least by factor of 10 divided by the number of applications.

4. The method of claim 3, wherein the welded workpiece comprises components of precision and micro system technology.

5. The method of claim 3, characterized by the fact that the power of the laser pulse is changed over time.

6. The method of claim 5, characterized by the fact that a detector detects characteristic radiation from the welding site and that during processing the power of the laser is adjusted as a function of the radiation detected by the detector.

7. The method of claim 6, characterized by the fact that several welding seams are provided on a work piece.

8. The method of claim 7, characterized by the fact that the work piece and the laser beam execute a linear movement and/or a rotational movement relative to each other.

9. The method of claim 8, characterized by the fact that the relative movement between the work piece and the laser beam is controlled as a function of a desired position of the laser beam impinging on the work piece detected by an evaluation unit.

10. The method of claim 9, characterized by the fact that the relative movement between work piece and laser beam is controlled as a function of an instant impingement position of the laser beam on the work piece detected by an evaluation unit.

11. The method of claim 9, characterized by the fact that the relative movement between work piece and laser radiation is achieved by movement of the laser radiation.

12. The method of claim 3, characterized by the fact the welding seam is formed in an atmosphere of protective gas.

13. The method of claim 3, characterized by the fact that the workpiece comprises watch components are being welded.

14. The method of claim 3, characterized by the fact that the workpiece comprises components of fuel feed devices for combustion engines or plug connections.

15. The method of claim 3, characterized by the fact that the workpiece comprises foil capacitors.

* * * * *